United States Patent
Margolin et al.

(10) Patent No.: US 12,443,506 B2
(45) Date of Patent: Oct. 14, 2025

(54) REAL-TIME REMOTE SYSTEM SHUTDOWN PREDICTION

(71) Applicant: Intuit, Inc., Mountain View, CA (US)

(72) Inventors: Itay Margolin, Petah Tikva (IL); Aleksandr Kim, Tel-Aviv (IL); Yair Horesh, Kefar-Sava (IL)

(73) Assignee: Intuit Inc., Mountain View, CA (US)

( * ) Notice: Subject to any disclaimer, the term of this patent is extended or adjusted under 35 U.S.C. 154(b) by 112 days.

(21) Appl. No.: 18/240,234

(22) Filed: Aug. 30, 2023

(65) Prior Publication Data

US 2025/0077382 A1    Mar. 6, 2025

(51) Int. Cl.
*G06F 11/34* (2006.01)

(52) U.S. Cl.
CPC ...... *G06F 11/3452* (2013.01); *G06F 11/3447* (2013.01)

(58) Field of Classification Search
CPC ............ G06F 11/3452; G06F 11/3447; H04L 43/0823
See application file for complete search history.

(56) References Cited

U.S. PATENT DOCUMENTS

| | | | |
|---|---|---|---|
| 2015/0081470 A1* | 3/2015 | Westphal | G06Q 30/0631 705/26.7 |
| 2016/0323158 A1* | 11/2016 | Hu | H04L 43/0876 |
| 2019/0303783 A1* | 10/2019 | Utsumi | G06N 7/00 |
| 2020/0394455 A1* | 12/2020 | Lee | G06N 20/00 |
| 2021/0297171 A1* | 9/2021 | Jornod | G06N 20/00 |
| 2022/0012641 A1* | 1/2022 | Iyengar | G06N 20/20 |
| 2024/0211234 A1* | 6/2024 | Gill | G06F 8/65 |

* cited by examiner

*Primary Examiner* — Rachel J Hackenberg
*Assistant Examiner* — Jihad K Boustany
(74) *Attorney, Agent, or Firm* — Dinsmore & Shohl LLP

(57) ABSTRACT

Certain aspects of the disclosure provide a method for detecting data collection errors by processing error data with a plurality of regression models to generate a plurality of predicted error rates over a plurality of time intervals. The method includes determining an error mode by applying a set of policy rules optimized for determining the error mode to the plurality of predicted error rates.

20 Claims, 6 Drawing Sheets

500

Train a plurality of regression models to predict error rates over a plurality of time intervals
502

Generate, via the trained plurality of regression models, a plurality of predicted error rates including at least one predicted error rate for each different time interval in the plurality of time intervals
504

Optimize, via a policy engine, a set of policy rules for determining an error mode based on the plurality of predicted error rates
506

*FIG. 5*

REAL-TIME REMOTE SYSTEM SHUTDOWN PREDICTION

BACKGROUND

Field

Aspects of the present disclosure relate to systems and methods for predicting remote system outages, such as predicting a data outage for a remote data provider.

Description of Related Art

Third-party data is relied on for myriad services in the digital interconnected world. For example, search engines may obtain data from various websites, an application may consolidate data from remote data providers, etc. In some cases, vast amounts of data are obtained from remote systems, for example, some data collection systems may acquire data at high resolutions from many remote systems. Such systems may obtain such data through web-scraping, application processing interfaces, file-transfers, etc.

When successful, a system may obtain the desired data from the remote system for various downstream processing. However, a remote system may have a data error or outage, a system failure, etc., for example, a remote system may be unavailable due to a planned or unplanned outage. The remote system may not communicate the outage, the systems affected, or an outage time period, etc. to the data collection system. Thus, the data collection system may continue to attempt to collect data from the affected remote system while the remote system is unavailable because the data collection system is unaware of the remote system data outage.

Further, even if the data collection system becomes aware of the outage, it may nevertheless be unaware of the likely outage period. Consequently, the data collection system cannot readily suspend data collection during the outage and resume data collection once the remote system is available. For example, the data collection system may still need to query the remote system to determine when the remote system is available again, otherwise, the data collection system may miss available data.

Thus, a technical problem exists in the art in which data collection systems fail to predict and inefficiently handle remote system data outages. This leads to significant loss in physical and financial resources, such as wasted compute, wasted network activity, wasted memory allocation, and wasted costs associated with deploying the same. While some data collection systems may suspend data collection attempts for a set time period to allow for the remote system to become available, the set time period is generally arbitrarily chosen and inaccurate, thus leading to related technical problems. For example, if the suspension time is greater than the length of the outage, the data collection system may miss data. On the other hand, if the suspension time is less than the length of the outage, the data collection system may attempt to collect data when the remote system is still unavailable leading to more resource loss.

Accordingly, there is a need in the art for improved systems and methods for managing data collection of remote systems to promote efficient data collection.

SUMMARY

One aspect provides a method for detecting data collection errors, comprising: receiving, from a remote system, error data; processing the error data with a plurality of regression models to generate a plurality of predicted error rates over a plurality of time intervals, wherein: each respective regression model of the plurality of regression models is configured to predict an error rate over a respective time interval different from each other regression model in the plurality of regression models, and the plurality of predicted error rates includes at least one predicted error rate for each different time interval in the plurality of time intervals; and determining an error mode by applying a set of policy rules configured for determining the error mode to the plurality of predicted error rates.

Another aspect provides for a method for training an error determination model, comprising: raining a plurality of regression models to predict error rates over a plurality of time intervals, wherein each respective regression model of the plurality of regression models is trained to predict an error rate over a respective time interval different than each other regression model in the plurality of regression models; generating, via the trained plurality of regression models, a plurality of predicted error rates including at least one predicted error rate for each different time interval in the plurality of time intervals; and optimizing, via a policy engine, a set of policy rules for determining an error mode based on the plurality of predicted error rates.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 5 depicts an example method for training an error determination model.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
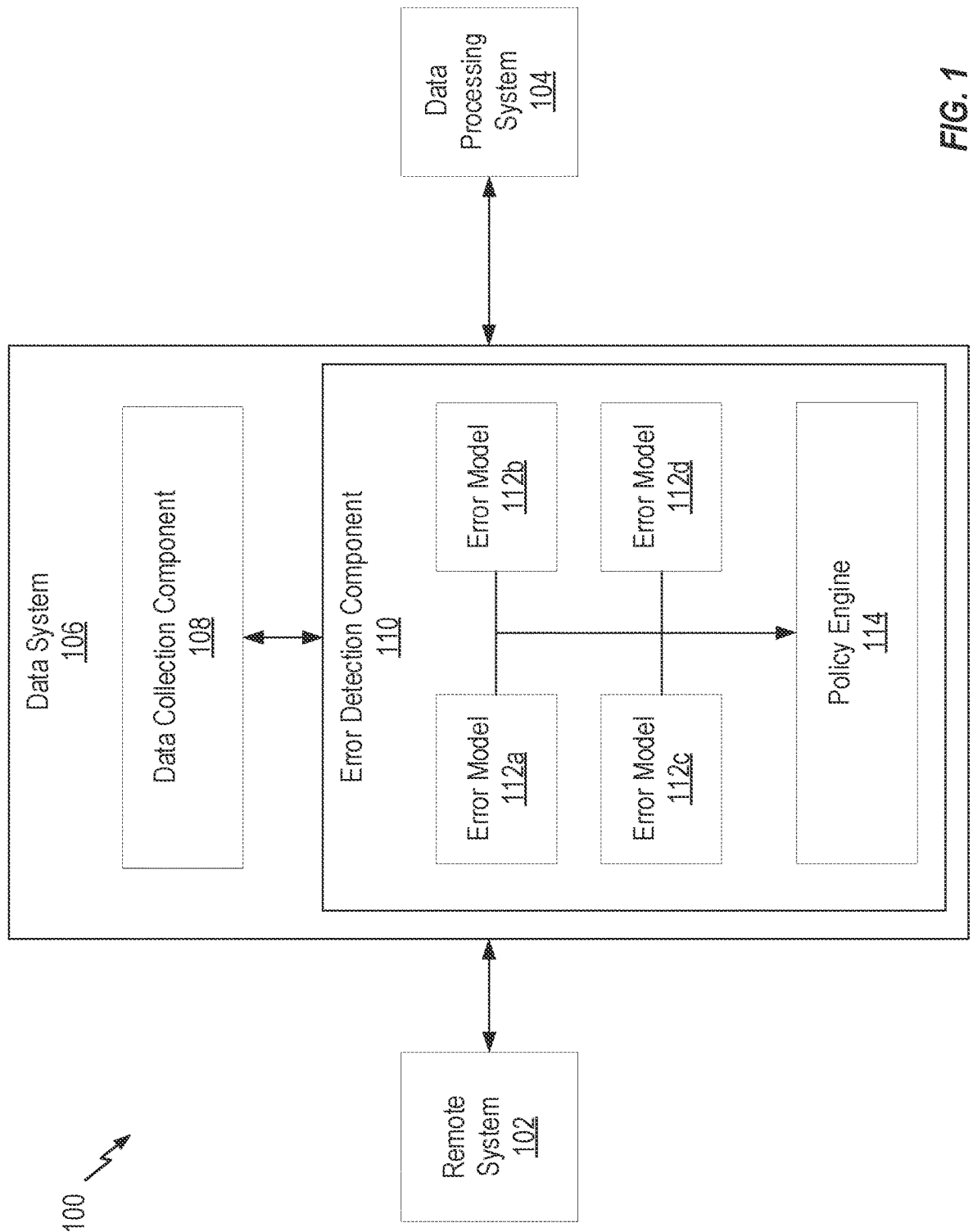
FIG. 1 depicts an example system for predicting outages for a remote system.

Aspects of the present disclosure provide apparatuses, methods, processing systems, and computer-readable mediums for managing data collection, including determining a data outage for a remote data provider and predicting an outage period.

As described above, there exists a technical problem with data collection systems reliant on timely collection of data from remote systems when such systems are unaware of remote system data outages and are unable to predict outage periods. As above, this technical problem may result in many inefficiencies, such as waste of resources, unsuccessful data retrieval, delays on downstream processing, etc. For example, a data collection system may waste resources attempting to retrieve data from the remote system during an error mode or data outage. Further, if the data collection system suspends data retrieval attempts every time the remote system returns an error, then the data collection system may miss successful data retrieval attempts. Additionally, further downstream processing of the retrieved data may be delayed or otherwise compromised, due to the lack of data from the remote system. As above, conventional data collection systems cannot predict the length of the outage period of the remote system, and thus are unable to anticipate when data may be available again, such as for successful retrieval or resumption of downstream processing.

Current methods for determining remote system outages may rely on significant anomalies in data collection. For example, where 95% of recent attempts result in errors, a data outage may be declared. This sort of approach inherently wastes resources. Moreover, such methods may not catch less consistent but nevertheless present remote system outages, such as short time period outages owing to the simplistic percentage-error based approach. Notably, where a data collection system makes thousands of attempts every minute, even small remote system data outages may result in a large volume of unsuccessful data collection attempts.

Aspects described herein provide a technical solution to these technical problems by providing systems and methods for determining an error mode (or state) for a remote system based on one or more predicted error rates for one or more different time prediction time horizons (intervals). The multi-interval predictions provide a basis for optimizing a policy for continuing or pausing data collection from a remote system. For example, based on the learned policy, based on a determined error mode for the remote system, data collection is paused during the error mode and continued (or resumed) when the remote system is not in an error mode.

In aspects, data collection attempts may further be efficiently managed by predicting error modes, including minor (e.g., relatively short time period) error modes, for the remote system. For example, by using a plurality of regression models trained to predict error rates for different time intervals, an error mode may be determined whether associated with a short time interval or a long time interval. Beneficially, then, a greater number of remote error modes may be determined and for various time intervals, allowing the data collection system to accordingly pause and resume data collection.

Thus, aspects described herein beneficially employ learned policies to maximize efficient use of resources. For example, a policy may be devised such as to pause data collection when a remote system is determined to be in an error mode for a predicted outage period, and to thereafter resume data collection following the predicted outage period. Thus, unlike conventional methods that rely on fixed, arbitrary time periods for pausing collections, the learned policies described herein allow for predicting outage periods and affecting data collection based on the same. Beneficially, then, the data collection resources are saved for the successful data retrieval attempts, rather than unsuccessful attempts. Further, downstream processes may be more efficiently managed, for example, by pausing and resuming such processes based on the availability of recent data from the remote system.

Example System for Predicting Remote System Outages

FIG. 1 depicts an example system 100 for predicting data outages for a remote system 102, for example, to avoid wasting resources on unsuccessful data collection attempts by a data system 106. In this example, one remote system 102 is depicted, however, system 100 may include additional remote systems. Data system 106 is configured to obtain data from remote system 102 for use by data processing system 104, for example, for analytics, processing, storage, etc.

Data system 106 comprises data collection component 108 and error determination component 110. Data collection component 108 is configured to acquire data from remote system 102. Data collection component 108 may acquire data from remote system 102 through data scraping, data crawling, an application programming interface (API), file-transfer, and the like.

Error determination component 110 is configured to determine an error mode for remote system 102 and indicate to data collection component 108 whether to continue data collection attempts or pause data collections attempts. Beneficially, where a remote system is in an error mode, pausing collection of data by a data collection component reduces waste of processing resources by reducing and/or eliminating futile data collection attempts because data is not obtained from the remote system during an error mode. Error determination component 110 may determine an error mode for remote system 102 by applying predicted error rates to a policy for error mode determination, as described in further detail herein. An error mode for remote system 102 may be where attempts to collect data from remote system 102 are likely to result in error. Further, error determination component 110 may determine a time interval for the error mode of remote system 102, e.g., a data outage period, allowing data collection component 108 to resume data collection when remote system 102 is no longer in an error mode. Thus, error determination component 110 reduces waste of processing resources for unsuccessful data collection attempts, while also ensuring data is successfully collected, whenever possible.

In this example, error determination component 110 comprises error model 112a, error model 112b, error model 112c, and error model 112d (collectively, "error models 112"), and policy engine 114. Error models 112 are configured to predict error rates for respective time intervals, for example, error model 112a is configured to predict an error rate for a first time interval, error model 112b is configured to predict an error rate for a second time interval, error model 112c is configured to predict an error rate for a third time interval, and error model 112d is configured to predict an error rate for a fourth time interval. In this example, four error models are depicted, however, additional or fewer error models, each associated with respective time intervals are contemplated. For example, where the error rate for two time intervals is desired, two error models may be utilized. An error rate predicted by one of error models 112 may be a ratio of the number of attempts to collect data from remote system 102 in the next time interval (e.g., next one minute, next two minutes, etc.) predicted to result in an error.

In some embodiments, each of error models 112 may be a regression model, for example, an XGBoost regression model. In embodiments, error models 112 may be associated with a particular remote system (e.g., 102), for example, where the system 100 interacts with additional remote systems, a plurality of error models may be associated with each of the remote systems.

Policy engine 114 is configured to determine and apply a set of policy rules comprising a policy for data collection component, as described in further detail below, for example, with respect to FIG. 2. For example, based on the predicted error rates from error models 112, a set of policy rules may determine whether remote system 102 is in an error mode. Further, a data outage for remote system 102 may be declared based on the determined error mode. The set of policy rules may further indicate whether to continue data collection or pause data collection. Further, policy engine 114 may determine an outage period for which to data collection component 108 is to pause data acquisition.

Example Training Process Flow for Training an Error Determination Component

Figure 2:
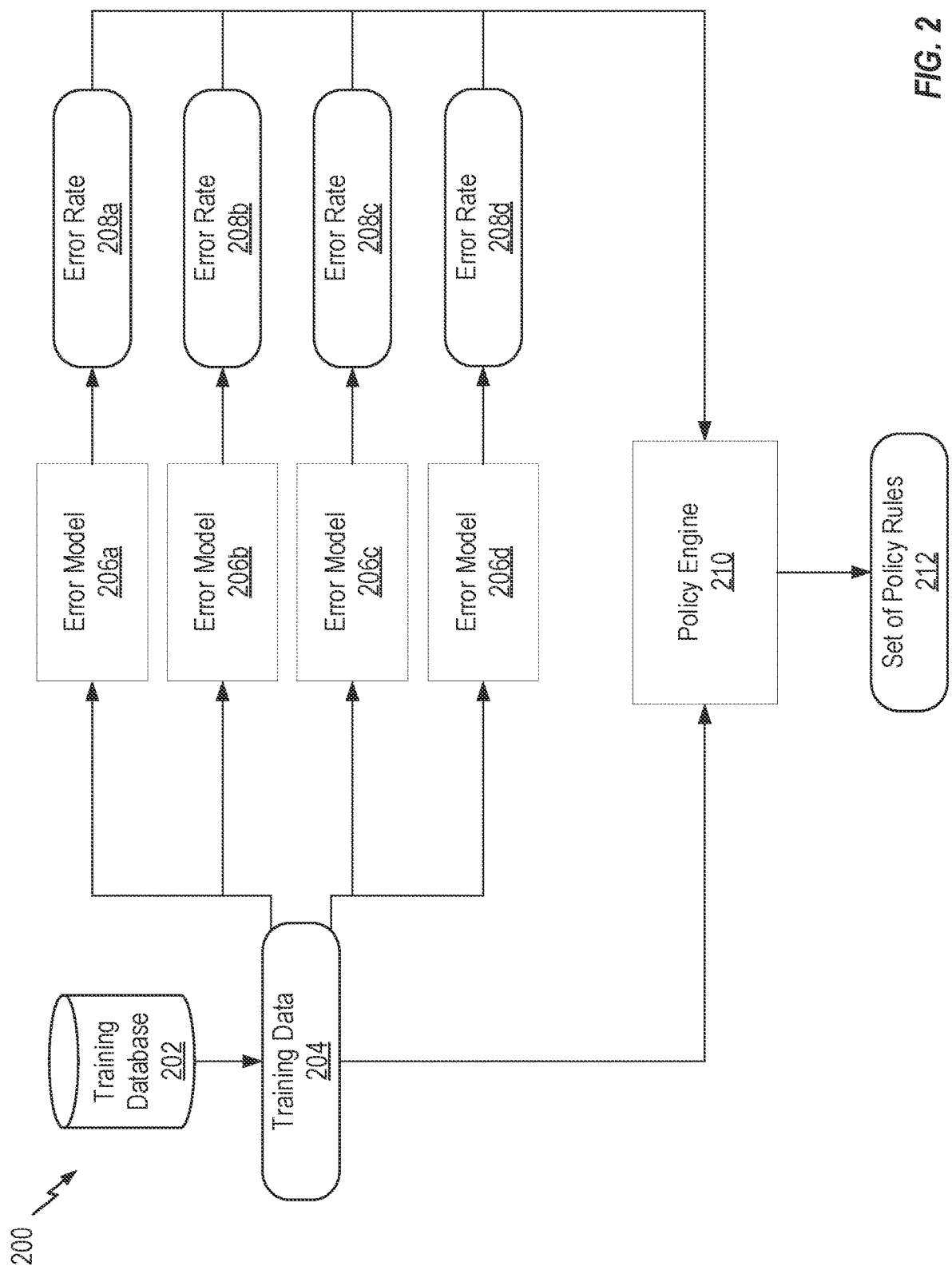
FIG. 2 depicts an example training process flow for training an error determination model.

FIG. 2 depicts an example training process flow for training an error determination component, such as error determination component 110 in FIG. 1, to manage data collection by a data system.

Training data 204 may be obtained from training database 202. Training database 202 may store data related to historical data collection attempts. A data collection attempt may be an individual retrieval of data from a remote system, for example, remote system 102 in FIG. 1. In some cases, a data collection attempt results in an error, and the data retrieved may include information related to one or more errors associated with the attempt. Training data 204 may include data associated with previous data collection attempts for training error models and/or a policy engine 210. Training data 204 may include data associated with each data collection attempt. Such data may include, for example, an identifier associated with the remote system accessed, a data and time of the attempt, a number of previous attempts during a prior interval (e.g., prior 5 minutes, 10 minutes, 60 minutes, etc.), a number and type of errors (e.g., a number of errors of a first type, a number of errors of a second type, etc.), and the like. In some examples, training data 204 may further include a day of the week for the attempt, an hour of the day for the attempt, an average volume of data collections for the remote system, a number and type of errors for each of the prior attempts for the one or more prior time intervals, etc. In some embodiments, training data 204 may include all attempts for a prior time period, for example, the three months prior to a training instance.

In some cases, training data 204 may be normalized before being used to train error model 206a, error model 206b, error model 206c, or error model 206d (collectively "error models 206"), for example, to account for higher error counts in longer prior time intervals, or to aggregate scattered data signals to a single stronger signal. In embodiments, error models 206 may be error models 112 in FIG. 1.

Each of error models 206 may be trained to predict an error rate for a set time interval. For example, error model 206a may be trained to predict an error rate 208a for a first time interval (e.g., subsequent 1 minute), error model 206b may be trained to predict an error rate 208b for a second time interval (e.g., subsequent 2 minutes), error model 206c may be trained to predict an error rate 208c for a third time interval (e.g., subsequent 4 minutes), and error model 206d may be trained to predict an error rate 208d for a fourth time interval (e.g., subsequent 8 minutes). In this example, four error models are depicted, however, additional or fewer error models may be trained. An error rate predicted by one of error models 206 may be a ratio of the number of attempts to collect data from remote system in the next time interval predicted to result in an error. For example, a predicted error rate for the subsequent 4 minutes may be 75%.

In embodiments, each of error models 206 may be an XGBoost regression model. An XGBoost regression model is a regression predictive model using an ensemble of decision tree models. Each of the plurality of XGBoost regression models (e.g., error models 206) has a numerical target variable, a predicted error rate. In embodiments, error models 206 may be trained to maximize an $R^2$ value for each regression model. For example, an $R^2$ value (e.g., a coefficient of determination) may indicate the closeness of fit of the training data 204 to the model. In embodiments, other gradient boosted machine learning models may be used, for example, LightGBM. In some embodiments, each of error models 206 may be a random forest model.

Error rate 208a, error rate 208b, error rate 208c, and error rate 208d, (collectively, "error rates 208"), and training data 204 may be used by policy engine 210 to determine a set of policy rules 212. In some cases, features of training data 204 used by policy engine 210 may include an identifier associated with the remote system accessed, a day of the week, an hour of the day, an average volume of data collection attempts for the remote system, a number of previous attempts, a number and type of errors, etc. In some embodiments, the training data 204 may be normalized before use by policy engine 210.

In some embodiments, error rates 208 may be predicted for each of one or more error types and for all error types for each respective time interval. Different types of errors may include, for example, an error associated with the attempt, an error associated with a communication protocol, an error in processing the request, an error associated with the data provided, a redirection error, etc. Error rates 208 may include a predicted error rate for each type of error and/or all errors in a time interval. For example, error rate 208a may include a predicted error rate for each type of error in the first time interval (e.g., a predicted type one error rate for type one errors in the first time interval, a predicted type two error rate for type two errors in the first time interval, etc.) and a predicted error rate for all error types in a first time interval (e.g., a predicted error rate for type one and type two errors in the first time interval). As another example, error rate 208b may include a predicted error rate for each type of error in the second time interval and for all error types in a second time interval. Error rate 208c and error rate 208d may similarly include a predicted error rate for all error types and for each type of error for their respective time intervals.

Policy engine 210 is configured to optimize a set of policy rules 212 that may be used to implement a policy and instruct a data collection component, such as data collection component 108 in FIG. 1, whether to continue or pause data collections. Policy engine 210 applies the error rates 208 and associated data to the set of policy rules 212 to determine an error mode and an associated time interval for a remote system. In embodiments, the set of policy rules 212 may be optimized using a genetic algorithm. Policy engine 210 may use an optimization metric to evaluate the optimization of the set of policy rules 212 against training data 204 to find the set of policy rules 212 yielding the best performance. For example, the set of policy rules 212 may be evaluated by the $F_1$ score, the Harmonic mean of precision and recall, as the optimization metric, where precision is the probability of positive predictions that are true members of the positive class and recall is the probability of positive predictions that are true members of the positive class out of all positive predictions. In another example, the set of policy rules 212 may be evaluated by the F-beta score, the weighted mean of precision and recall, as the optimization metric. As another example, the set of policy rules 212 may be evaluated by setting a level of precision or recall, and obtaining the maximum of the other, as the optimization metric.

In embodiments, the set of policy rules 212 may comprise one or more rules based on one or more of error rate 208a, error rate 208b, error rate 208c or error rate 208d. One or more rules in the set of policy rules 212 may determine the applicability of an error mode and an applicable forward time interval for the error mode based on an error rate, for example, meeting, exceeding, or below a threshold. For example, a rule may comprise if error rate 208a is greater than a threshold, then an error mode is determined for an applicable forward time interval. In another example, if error rate 208b is less than a threshold, then an error mode is determined for an applicable forward time interval. One or more rules in the set of policy rules 212 may further be based on a remote system average volume, a day of the week, an hour of the day, a number of previous attempts, a number and type of errors, etc. For example, a rule may comprise if a remote system average volume is above a first threshold, and error rate 208c is less than a second threshold, then an error mode is determined for a forward time interval. In another example, a rule may comprise allowing data collection to continue. In some embodiments, the rules in the set of policy rules 212 may be ordered, for example, sequentially. Thereby, when applying an error rate to the set of policy rules 212, the first rule found to be true may be executed. Note that FIG. 2 is just one example of a process flow, and other flows including fewer, additional, or alternative steps are possible consistent with this disclosure.

Example Process Flow for Predicting Outages of a Remote System

Figure 3:
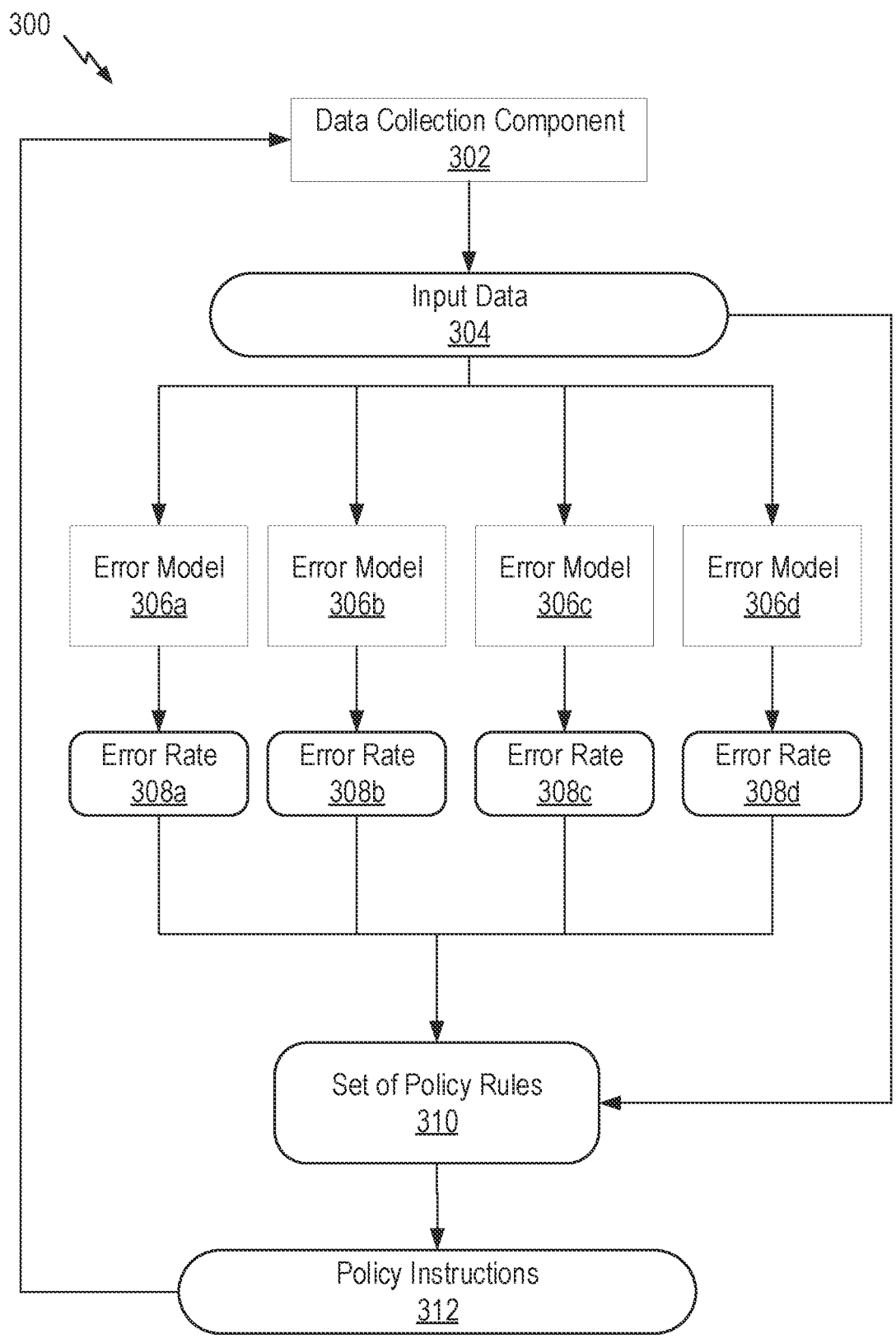
FIG. 3 depicts an example process flow for predicting outages for a remote system.

FIG. 3 depicts an example process flow 300 for predicting outages for a remote system, for example, by aspects of system 100 in FIG. 1.

Data collection component 302, for example, data collection component 108 in FIG. 1, is configured to acquire data from a remote system, for example, remote system 102 in FIG. 1. Data collection component 302 may acquire data through an API, web-scraping, file-transfers, etc.

Data collection component 302 is configured to generate input data 304 associated with data collection attempts for the remote system. Input data 304 may include, for example, an identifier associated with the remote system accessed, a data date and time of the attempt, a number of previous attempts, a number and type of errors (e.g., a number of errors of a first type, a number of errors of a second type, etc.), and the like. In some examples, input data 304 may further include a day of the week for the attempt, an hour of the day for the attempt, an average volume of data collections for the remote system, a number of prior attempts for one or more prior time intervals, a number and type of errors for each of the prior attempts for the one or more prior time intervals, etc.

Input data 304 is processed by one or more error models, each error model associated with a particular time interval. In this example, error model 306a is associated with a first time interval, error model 306b is associated with a second time interval, error model 306c is associated with a third time interval, and error model 306d is associated with a fourth time interval. Each respective error model is trained to predict an error rate associated with its respective time interval, such as described with respect to FIG. 2. For example, error model 306a is trained to predict an error rate 308a associated with a first time interval based on input data 304. Similarly, error model 306b, error model 306c, and error model 306d are respectively trained to predict error rate 308b associated with a second time interval, error rate 308c associated with a third time interval, and error rate 308d associated with a fourth time interval. Although depicted here as four error models and four associated predicted error rates, additional or fewer error models and predicted error rates are possible.

Error rate 308a, error rate 308b, error rate 308c, and error rate 308d (collectively "error rates 308"), as well as input data 304, are applied to set of policy rules 310, for example, set of policy rules 212 optimized by policy engine 210 in FIG. 2, in order to determine an error mode for the remote system. The first rule of the set of policy rules 310 satisfied by the predicted error rates 308 and input data 304 is implemented by sending policy instructions 312 based on the rule to data collection component 302. For example, where the first rule of set of policy rules 310 satisfied by the predicted error rates 308 and input data 304 determines the remote system is in an error mode for a first time interval, policy instructions 312 indicate to data collection component 302 to pause data collection for the remote system for the first time interval. In another example, where the first rule of set of policy rules 310 satisfied by the predicted error rates 308 and input data 304 determines the remote system is not in an error mode, policy instructions 312 indicate to data collection component 302 to continue data collection for the remote system.

Further, a remote system outage may be declared, and an associated outage period determined based on applicability of the error rates 308 and input data 304 to the set of policy rules 310. Policy instructions 312 may be provided to data collection component 302 to implement.

Data collection component 302 may then, beneficially, pause data collection from the remote system where the remote system is determined to be in an error mode based on applying the error rates 308 to the set of policy rules 310. Thus, data collection component 302 may reduce the number of data collection attempts resulting in errors because the set of policy rules 310 determined the remote system to be in an error mode, thereby saving processing resources. Additionally, through the set of policy rules 310 and the error rates 308, an outage period may be determined, tailoring a pause in data collection attempts to only a period where the remote system is in an error mode and resuming data collection attempts following the outage period. Further, where the remote system is not determined to be in an error mode, data collection component 302 may continue successful data collections, thereby ensuring continuous and consistent data collection.

In some embodiments, process flow 300 proceeds based on a set time interval, such as every two minutes. In some embodiments, process flow 300 proceeds with every data collection attempt.

Note that FIG. 3 is just one example of a process flow, and other flows including fewer, additional, or alternative steps are possible consistent with this disclosure.

Example Method for Detecting Data Collection Errors

Figure 4:
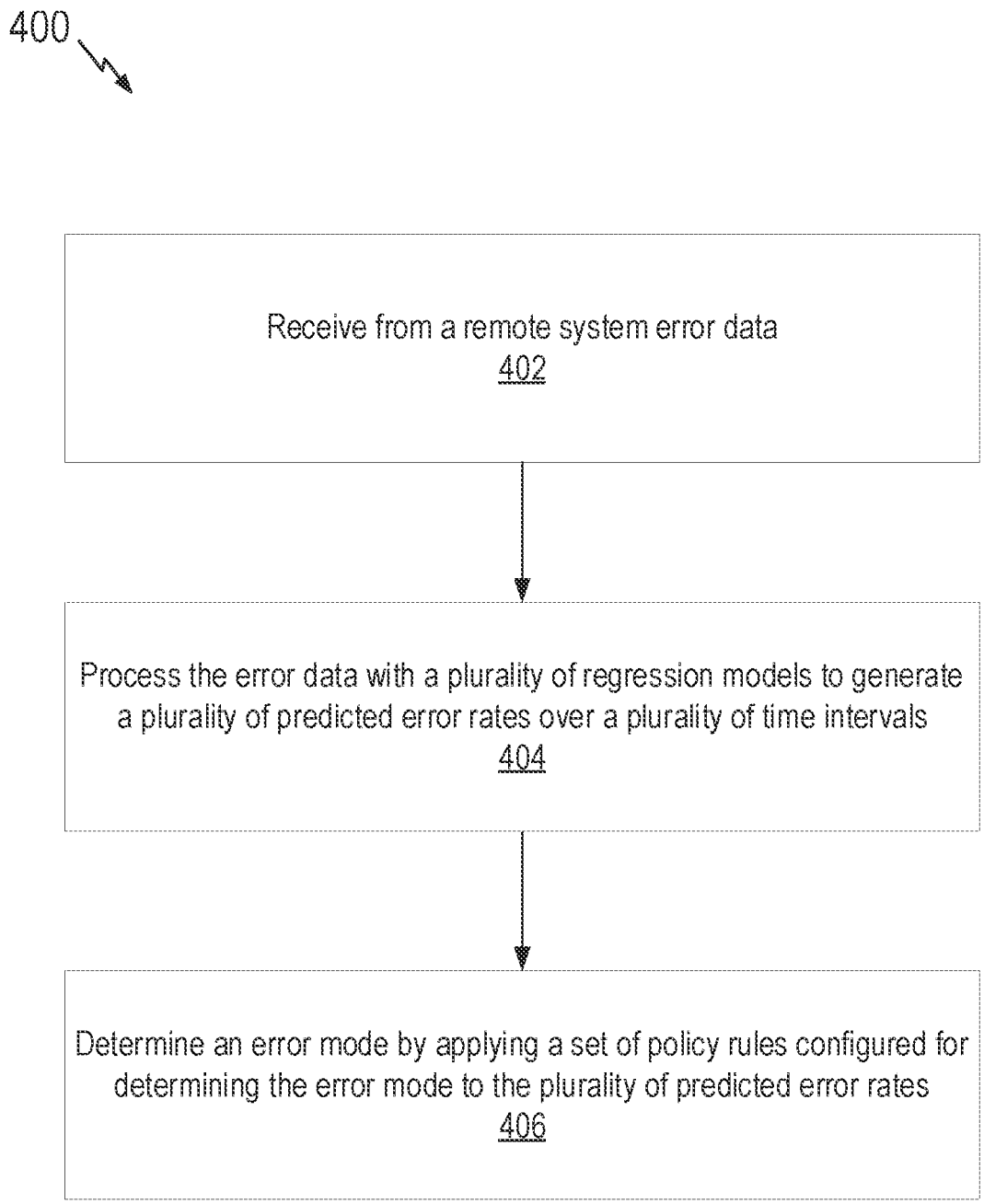
FIG. 4 depicts an example method for detecting data collection errors.

FIG. 4 depicts an example method 400 for detecting data collection errors, such as by a data system, for example, data system 106 in FIG. 1.

Initially, method 400 begins at step 402 with receiving, from a remote system, such as remote system 102 in FIG. 1, error data, such as input data 304 in FIG. 3.

In some embodiments, the error data comprises at least one error type; an identifier associated with the remote system; a time and data associated with the error data; and a number of attempts for data collection, and the set of rules are further based on at least one of: at least one error type; an identifier associated with the remote system; a time and date associated with the error data; or a number of attempts for data collection.

Method 400 proceeds to step 404 with processing the error data with a plurality of regression models, such as error models 112 in FIG. 1 or error models 306 in FIG. 3. Further, each respective regression model of the plurality of regression models is configured to predict an error rate over a respective time interval different than each other regression model in the plurality of regression models, for example, as described with respect to each of error model 306a, error model 306b, error model 306c, and error model 306d in FIG. 3. Additionally, the plurality of predicted error rates includes at least one predicted error rate for each different time interval in the plurality of time intervals, such as error rate 308a, error rate 308b, error rate 308c, and error rate 308d in FIG. 3.

In some embodiments, each of the plurality of regression models is an XGBoost regression model.

In some embodiments, the at least one predicted error rate for each different time interval in the plurality of time intervals, comprises a first error rate associated with a plurality of error types in each different time interval, and at least one second error rate associated with each of the plurality of error types in each different time interval.

Method 400 then proceeds to step 406 with determining an error mode by applying a set of policy rules, for example, as described with respect to set of policy rules 310 in FIG. 3, configured for determining the error mode to the plurality of predicted error rates.

In some embodiments, method 400 further comprises in response to determining the error mode, declaring a remote system data outage; and pausing collection of data from the remote system for an outage period based on at least one of the policy rules in the set of policy rules, such as described with respect to policy instructions 312 in FIG. 3.

In some embodiments, method 400 further comprises resuming the collection of data from the remote system following expiration of the outage period, for example, by data collection component 108 in FIG. 1.

Note that FIG. 4 is just one example of a method, and other flows including fewer, additional, or alternative steps are possible consistent with this disclosure.

Example Method for Training an Error Determination Model

FIG. 5 depicts an example method 500 for training an error determination model, such as error determination component 110 in FIG. 1.

Initially, method 500 begins at step 502 with training a plurality of regression models, such as error models 206 in FIG. 2, to predict error rates over a plurality of time intervals, for example, error rates 208 in FIG. 2, wherein each respective regression model of the plurality of regression models is trained to predict an error rate over a respective time interval different than each other regression model in the plurality of regression models.

Method 500 proceeds to step 504 with generating, via the trained plurality of regression models, a plurality of predicted error rates including at least one predicted error rate for each different time interval in the plurality of time intervals. For example, as described with respect to FIG. 2, error model 206a predicts an error rate 208a for a first time interval, and error model 206b predicts an error rate 208b for a second time interval.

Method 500 then proceeds to step 506 with optimizing, via a policy engine, such as policy engine 210 in FIG. 2, a set of policy rules, for example, set of policy rules 212 in FIG. 2, for determining an error mode based on the plurality of predicted error rates.

In some embodiments, the at least one predicted error rate for each different time interval in the plurality of time intervals, comprises a first error rate associated with a plurality of error types in each different time interval, and at least one second error rate associated with each of the plurality of error types in each different time interval.

In some embodiments, each rule of the set of policy rules determines the applicability of an error mode for a forward time interval based on an error rate predicted by at least one regression model of the plurality of regression models for that forward time interval, such as described with respect to set of policy rules 212 in FIG. 2.

In some embodiments, each of the plurality of regression models is an XGBoost regression model, and optimizing, via the policy engine, the set of policy rules for determining the error mode based on the plurality of predicted error rate comprises using a genetic algorithm to perform the optimization.

In some embodiments, the genetic algorithm is configured to user an F-beta score as an optimization metric. In some embodiments, the genetic algorithm is configured to use an $F_1$ score as an optimization metric.

In some embodiments, the plurality of regression models are trained with error data, wherein the error data comprises at least one of: at least one error type; an identifier associated with a remote system; a time and date associated with the error data; or number of attempts for data collection, such as described with respect to training data 204 in FIG. 2.

In some embodiments, the set of policy rules is further based on error data, wherein the error data comprises at least one of: at least one error type; an identifier associated with a remote system; a time and date associated with the error data; or a number of attempts for data collection, for example, as described with respect to policy engine 210 in FIG. 2.

Note that FIG. 5 is just one example of a method, and other flows including fewer, additional, or alternative steps are possible consistent with this disclosure.

Example Processing System for Detecting Data Collection Errors

Figure 6:
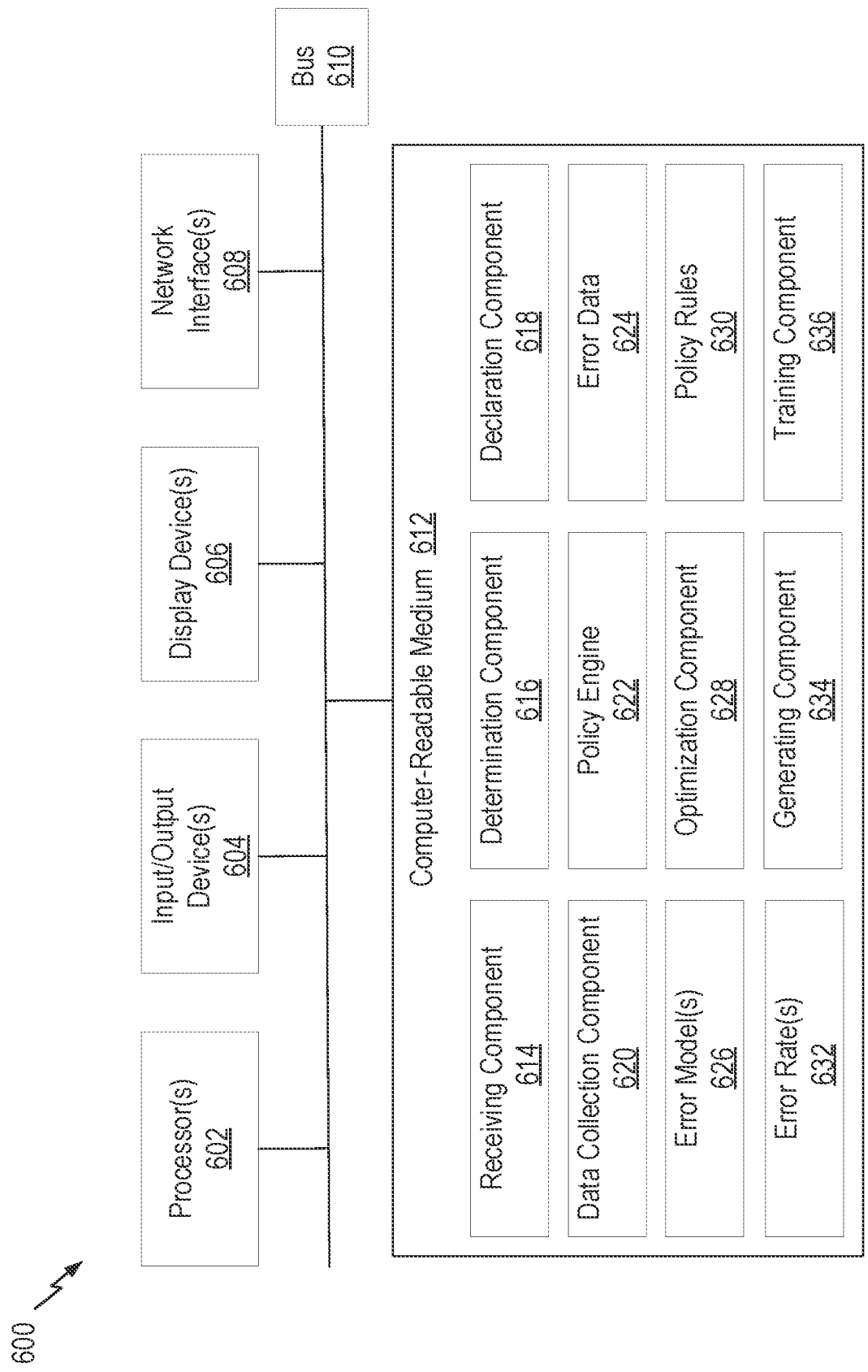
FIG. 6 depicts an example processing system with which aspects of the present disclosure can be performed.

FIG. 6 depicts an example processing system 600 configured to perform various aspects described herein, including, for example, process flow 200 as described above with respect to FIG. 2, process flow 300 as described above with respect to FIG. 3, method 400 as described above with respect to FIG. 4, or method 500 as described above with respect to FIG. 5.

Processing system 600 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 600 includes one or more processors 602, one or more input/output devices 604, one or more display devices 606, and one or more network interfaces 608 through which processing system 600 is connected to one or more networks (e.g., a local network, an intranet, the Internet, or any other group of processing systems communicatively connected to each other), and computer-readable medium 612.

In the depicted example, the aforementioned components are coupled by a bus 610, which may generally be configured for data and/or power exchange amongst the components. Bus 610 may be representative of multiple buses, while only one is depicted for simplicity.

Processor(s) 602 are generally configured to retrieve and execute instructions stored in one or more memories, including local memories like the computer-readable medium 612, as well as remote memories and data stores. Similarly, processor(s) 602 are configured to retrieve and store application data residing in local memories like the computer-readable medium 612, as well as remote memories and data stores. More generally, bus 610 is configured to transmit programming instructions and application data among the processor(s) 602, display device(s) 606, network interface(s) 608, and computer-readable medium 612. In certain embodiments, processor(s) 602 are included to be representative of a one or more central processing units (CPUs), graphics processing unit (GPUs), tensor processing unit (TPUs), accelerators, and other processing devices.

Input/output device(s) 604 may include any device, mechanism, system, interactive display, and/or various other hardware components for communicating information between processing system 600 and a user of processing system 600. For example, input/output device(s) 604 may include input hardware, such as a keyboard, touch screen, button, microphone, and/or other device for receiving inputs from the user. Input/output device(s) 604 may further include display hardware, such as, for example, a monitor, a video card, and/or other another device for sending and/or presenting visual data to the user. In certain embodiments, input/output device(s) 604 is or includes a graphical user interface.

Display device(s) 606 may generally include any sort of device configured to display data, information, graphics, user interface elements, and the like to a user. For example, display device(s) 606 may include internal and external displays such as an internal display of a tablet computer or an external display for a server computer or a projector. Display device(s) 606 may further include displays for devices, such as augmented, virtual, and/or extended reality devices.

Network interface(s) 608 provide processing system 600 with access to external networks and thereby to external processing systems. Network interface(s) 608 can generally be any device capable of transmitting and/or receiving data via a wired or wireless network connection. Accordingly, network interface(s) 608 can include a communication transceiver for sending and/or receiving any wired and/or wireless communication. For example, Network interface(s) 608 may include an antenna, a modem, a LAN port, a Wi-Fi card, a WiMAX card, cellular communications hardware, near-field communication (NFC) hardware, satellite communication hardware, and/or any wired or wireless hardware for communicating with other networks and/or devices/systems. In certain embodiments, network interface(s) 608 includes hardware configured to operate in accordance with the Bluetooth® wireless communication protocol.

Computer-readable medium 612 may be a volatile memory, such as a random access memory (RAM), or a nonvolatile memory, such as nonvolatile random access memory, phase change random access memory, or the like. In this example, computer-readable medium 612 includes receiving component 614, determination component 616, declaration component 618, data collection component 620, policy engine 622, error data 624, error model(s) 626, policy rules 630, error rate(s) 632, optimization component 628, generating component 634, and training component 636.

In certain embodiments, receiving component 614 is configured to receive error data 624 from a remote system, such as described with respect to input data 304 in FIG. 3, or step 402 in FIG. 4.

In certain embodiments, determination component 616 is configured to determining an error mode by applying a set of policy rules 630 configured for determining the error mode to one or more error rates 632, via policy engine 622, such as described with respect to step 406 in FIG. 4.

In certain embodiments, declaration component 618 is configured to declare a remote system data outage, such as described with respect to FIG. 4.

In certain embodiments, data collection component 620 is configured to collect data from a remote system, such as data collection component 108 in FIG. 1, pause collection of data from the remote system for an outage period based on at least one of the policy rules in the set of policy rules 630, or resume the collection of data from the remote system following expiration of the outage period, such as described with respect to FIG. 4.

In certain embodiments, optimization component 628 is configured to optimize, via policy engine 622, a set of policy rules 630 for determining an error mode, such as described with respect to policy engine 210 in FIG. 2, or step 506 in FIG. 5.

In certain embodiments, generating component 634 is configured to generate, via one or more error models, one or more error rates 632, such as described with respect to error models 206 and error rates 208 in FIG. 2, or step 504 in FIG. 5.

In certain embodiments, training component 636 is configured to train a one or more error models to predict one or more error rates 632, such as described with respect to error models 206 and error rates 208 in FIG. 2, or step 502 in FIG. 5.

In certain embodiments, one or more error models 626 are configured to processing the error data with a plurality of regression models to generate one or more error rates 632, such as described with respect to step 404 in FIG. 4.

Note that FIG. 6 is just one example of a processing system consistent with aspects described herein, and other processing systems having additional, alternative, or fewer components are possible consistent with this disclosure.

Example Clauses

Implementation examples are described in the following numbered clauses:

Clause 1: A method for detecting data collection errors, comprising: receiving, from a remote system, error data; processing the error data with a plurality of regression models to generate a plurality of predicted error rates over a plurality of time intervals, wherein: each respective regression model of the plurality of regression models is configured to predict an error rate over a respective time interval different than each other regression model in the plurality of regression models, and the plurality of predicted error rates includes at least one predicted error rate for each different time interval in the plurality of time intervals; and determining an error mode by applying a set of policy rules configured for determining the error mode to the plurality of predicted error rates.

Clause 2: The method of clause 1, further comprising: in response to determining the error mode, declaring a remote system data outage; and pausing collection of data from the remote system for an outage period based on at least one of the policy rules in the set of policy rules.

Clause 3: The method of clause 2, further comprising resuming the collection of data from the remote system following expiration of the outage period.

Clause 4: The method of any one of clauses 1-3, wherein each of the plurality of regression models are an XGBoost regression model.

Clause 5: The method of any one of clauses 1-4, wherein: the error data comprises: at least one error type; an identifier associated with the remote system; a time and date associated with the error data; and a number of attempts for data collection, and the set of policy rules are further based on at least one of: at least one error type; an identifier associated with the remote system; a time and date associated with the error data; or a number of attempts for data collection.

Clause 6: The method of any one of clauses 1-5, wherein the at least one predicted error rate for each different time interval in the plurality of time intervals, comprises a first error rate associated with a plurality of error types in each different time interval, and at least one second error rate associated with each of the plurality of error types in each different time interval.

Clause 7: A method for training an error determination model, comprising: training a plurality of regression models to predict error rates over a plurality of time intervals, wherein each respective regression model of the plurality of regression models is trained to predict an error rate over a respective time interval different than each other regression model in the plurality of regression models; generating, via the trained plurality of regression models, a plurality of predicted error rates including at least one predicted error rate for each different time interval in the plurality of time intervals; and optimizing, via a policy engine, a set of policy rules for determining an error mode based on the plurality of predicted error rates.

Clause 8: The method of clause 7, wherein each rule of the set of policy rules determines the applicability of an error mode for a forward time interval based on an error rate predicted by at least one regression model of the plurality of regression models for that forward time interval.

Clause 9: The method of any one of clauses 7-8, wherein the at least one predicted error rate for each different time interval in the plurality of time intervals, comprises a first error rate associated with a plurality of error types in each different time interval, and at least one second error rate associated with each of the plurality of error types in each different time interval.

Clause 10: The method of any one of clauses 7-9, wherein: each of the plurality of regression models is an XGBoost regression model, and optimizing, via the policy engine, the set of policy rules for determining the error mode based on the plurality of predicted error rates comprises using a genetic algorithm to perform the optimization.

Clause 11: The method of clause 10, wherein the genetic algorithm is configured to use an F-beta score as an optimization metric.

Clause 12: The method of clause 10, wherein the genetic algorithm is configured to use an $F_1$ score as an optimization metric.

Clause 13: The method of any one of clauses 7-12, wherein the plurality of regression models are trained with error data, wherein the error data comprises at least one of: at least one error type; an identifier associated with a remote system; a time and date associated with the error data; or a number of attempts for data collection.

Clause 14: The method of any one of clauses 7-13, wherein the set of policy rules are further based on error data, wherein the error data comprises at least one of: at least one error type; an identifier associated with a remote system; a time and date associated with the error data; or a number of attempts for data collection.

Clause 15: A processing system, comprising: a memory comprising computer-executable instructions; and a processor configured to execute the computer-executable instructions and cause the processing system to perform a method in accordance with any one of Clauses 1-14.

Clause 16: A processing system, comprising means for performing a method in accordance with any one of Clauses 1-14.

Clause 17: A non-transitory computer-readable medium storing program code for causing a processing system to perform the steps of any one of Clauses 1-14.

Clause 18: A computer program product embodied on a computer-readable storage medium comprising code for performing a method in accordance with any one of Clauses 1-14.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for detecting data collection errors, comprising:
   receiving, from a remote system, error data;
   processing the error data with a plurality of regression models to generate a plurality of predicted error rates over a plurality of time intervals, wherein:
      each respective regression model of the plurality of regression models is configured to predict an error rate over a respective time interval different than each other regression model in the plurality of regression models, and
      the plurality of predicted error rates includes at least one predicted error rate for each different time interval in the plurality of time intervals;
   determining an error mode by applying a set of policy rules configured for determining the error mode to the plurality of predicted error rates;
   in response to determining the error mode, declaring a remote system data outage; and
   pausing collection of data from the remote system for an outage period based on at least one policy rule in the set of policy rules.

2. The method of claim 1, further comprising resuming the collection of data from the remote system following expiration of the outage period.

3. The method of claim 1, wherein each of the plurality of regression models are an XGBoost regression model.

4. The method of claim 1, wherein:
   the error data comprises:
      at least one error type;
      an identifier associated with the remote system;
      a time and date associated with the error data; and
      a number of attempts for data collection, and
   the set of policy rules are further based on at least one of:
      at least one error type;
      an identifier associated with the remote system;
      a time and date associated with the error data; or
      a number of attempts for data collection.

5. The method of claim 1, wherein the at least one predicted error rate for each different time interval in the plurality of time intervals, comprises a first error rate associated with a plurality of error types in each different time interval, and at least one second error rate associated with each of the plurality of error types in each different time interval.

6. The method of claim 1, wherein the error data comprises at least one of:
   a day of a week for a data collection attempt;
   an hour of the day for the data collection attempt;
   an average volume of data collections for the remote system;
   a number of prior data collection attempts for one or more prior time intervals for the data collection attempt; or
   a number and type of errors for each prior data collection attempt for the one or more prior time intervals for the data collection attempt.

7. The method of claim 1, wherein the error data is received at a set time interval.

8. A processing system, comprising: a memory comprising computer-executable instructions; and a processor configured to execute the computer-executable instructions and cause the processing system to:
   receive, from a remote system, error data;
   process the error data with a plurality of regression models to generate a plurality of predicted error rates over a plurality of time intervals, wherein:
      each respective regression model of the plurality of regression models is configured to predict an error rate over a respective time interval different than each other regression model in the plurality of regression models, and
      the plurality of predicted error rates includes at least one predicted error rate for each different time interval in the plurality of time intervals;
   determine an error mode by applying a set of policy rules configured for determining the error mode to the plurality of predicted error rates;
   in response to the determined error mode, declare a remote system data outage; and
   pause collection of data from the remote system for an outage period based on at least one policy rule in the set of policy rules.

9. The processing system of claim 8, wherein the processor is further configured to cause the processing system to resume the collection of data from the remote system following expiration of the outage period.

10. The processing system of claim 8, wherein each of the plurality of regression models are an XGBoost regression model.

11. The processing system of claim 8, wherein the at least one predicted error rate for each different time interval in the plurality of time intervals, comprises a first error rate associated with a plurality of error types in each different time interval, and at least one second error rate associated with each of the plurality of error types in each different time interval.

12. The processing system of claim 8, wherein:
   the error data comprises:

at least one error type;
an identifier associated with the remote system;
a time and date associated with the error data; and
a number of attempts for data collection, and
the set of policy rules are further based on at least one of:
at least one error type;
an identifier associated with the remote system;
a time and date associated with the error data; or
a number of attempts for data collection.

13. The processing system of claim 8, wherein the error data comprises at least one of:
a day of a week for a data collection attempt;
an hour of the day for the data collection attempt;
an average volume of data collections for the remote system;
a number of prior data collection attempts for one or more prior time intervals for the data collection attempt; or
a number and type of errors for each prior data collection attempt for the one or more prior time intervals for the data collection attempt.

14. The processing system of claim 8, wherein the error data is received at a set time interval.

15. A method for detecting data collection errors, comprising:
receiving, from a remote system, data collection attempt data;
processing the data collection attempt data with a plurality of error models to generate a plurality of predicted error rates over a plurality of time intervals, wherein:
each respective error model of the plurality of error models is configured to predict an error rate over a respective time interval different than each other error model in the plurality of error models, and
the plurality of predicted error rates includes at least one predicted error rate for each different time interval in the plurality of time intervals;
determining an error mode by applying a set of policy rules configured for determining the error mode to the plurality of predicted error rates;
in response to determining the error mode, declaring a remote system data outage; and
pausing collection of data from the remote system for an outage period based on at least one policy rule in the set of policy rules.

16. The method of claim 15,
further comprising resuming the collection of data from the remote system following expiration of the outage period.

17. The method of claim 15, wherein the at least one predicted error rate for each different time interval in the plurality of time intervals, comprises a first error rate associated with a plurality of error types in each different time interval, and at least one second error rate associated with each of the plurality of error types in each different time interval.

18. The method of claim 15, wherein:
the data collection attempt data comprises at least one of:
at least one error type,
an identifier associated with the remote system,
a time and date associated with the data collection attempt data,
a number of attempts for data collection,
a day of a week for a data collection attempt,
an hour of the day for the data collection attempt,
an average volume of data collections for the remote system,
a number of prior data collection attempts for one or more prior time intervals for the data collection attempt, or
a number and type of errors for each prior data collection attempt for the one or more prior time intervals for the data collection attempt; and
the set of policy rules are further based on at least one of:
at least one error type;
an identifier associated with the remote system;
a time and date associated with the collection attempt; or
a number of prior collection attempts.

19. The method of claim 15, wherein the data collection attempt data is received at a set time interval.

20. The method of claim 15, wherein each error model of the plurality of error models is an XGBoost regression model.

* * * * *